(12) United States Patent
McDaniel et al.

(10) Patent No.: US 6,425,933 B1
(45) Date of Patent: Jul. 30, 2002

(54) SYSTEMS AND METHODS FOR PRODUCING ORGANIC FERTILIZER, AND ORGANIC FERTILIZER MANUFACTURED USING SAID SYSTEMS OF METHODS

(75) Inventors: Jodie D. McDaniel, Edmond, OK (US); Terry Scott Humphry, Plano, TX (US)

(73) Assignee: William R. Austin, Shawnee, OK (US)

( * ) Notice: Subject to any disclaimer, the term of this patent is extended or adjusted under 35 U.S.C. 154(b) by 0 days.

(21) Appl. No.: 09/309,540

(22) Filed: May 11, 1999

(Under 37 CFR 1.47)

Related U.S. Application Data

(60) Provisional application No. 60/085,196, filed on May 12, 1998, and provisional application No. 60/087,763, filed on Jun. 2, 1998.

(51) Int. Cl.[7] .............................. C05F 3/00; C05F 3/06; B02C 19/06
(52) U.S. Cl. .............................. 71/21; 71/11; 71/64.04; 241/39; 241/43; 241/5; 241/29
(58) Field of Search ................................ 71/21, 22, 11, 71/64.04, 9; 241/5, 18, 29, 39, 43

(56) References Cited

U.S. PATENT DOCUMENTS

| | | | | |
|---|---|---|---|---|
| 3,744,145 A | * | 7/1973 | Maxwell et al. | 34/68 |
| 4,099,336 A | * | 7/1978 | Maffet | 34/12 |
| 4,242,809 A | * | 1/1981 | Elder | 34/33 |
| 4,519,831 A | * | 5/1985 | Moore | 71/13 |
| 4,813,996 A | * | 3/1989 | Gardner et al. | 71/21 |
| 5,129,993 A | * | 7/1992 | Bleeker | 159/74.3 |
| 5,185,087 A | * | 2/1993 | Lister et al. | 210/787 |
| 5,525,239 A | * | 6/1996 | Duske | 210/739 |
| 5,598,979 A | * | 2/1997 | Rowley, Jr. | 241/5 |

FOREIGN PATENT DOCUMENTS

| | | | | |
|---|---|---|---|---|
| DE | 3937039 A1 | * | 5/1991 | 71/21 |
| JP | 402022379 A | * | 1/1990 | 71/21 |

* cited by examiner

Primary Examiner—Milton I. Cano
Assistant Examiner—Robert Madsen
(74) Attorney, Agent, or Firm—Burleigh & Associates; Roger S. Burleigh

(57) ABSTRACT

Organic fertilizer produced from raw manure, and systems and methods related to the production thereof. A high-velocity air stream is injected into at least one substantially-closed chamber, where it interacts with a supply of raw manure; the raw manure can be bovine or other animal waste products. The high-velocity air stream pulverizes and dries the raw manure, whereby an end product having a moisture content substantially less than the initial moisture content and a live bacteria content substantially equal to the initial live bacteria content of the raw manure is produced. In a preferred embodiment, a cyclonic comminution apparatus is used to pulverize and dry the raw manure; alternatively, a first cyclonic comminution apparatus can be used to substantially pulverize the raw manure and a second cyclonic comminution apparatus can be used to substantially dry the raw manure. A complete system further includes a roll compactor to form briquets from the pulverized and dried raw manure, and a grinder to reduce the briquets to organic fertilizer pellets of a desired size. The system may also include a screening apparatus to separate ones of the organic fertilizer pellets having a size less than a desired size, and an apparatus for bagging the organic fertilizer pellets.

10 Claims, 3 Drawing Sheets

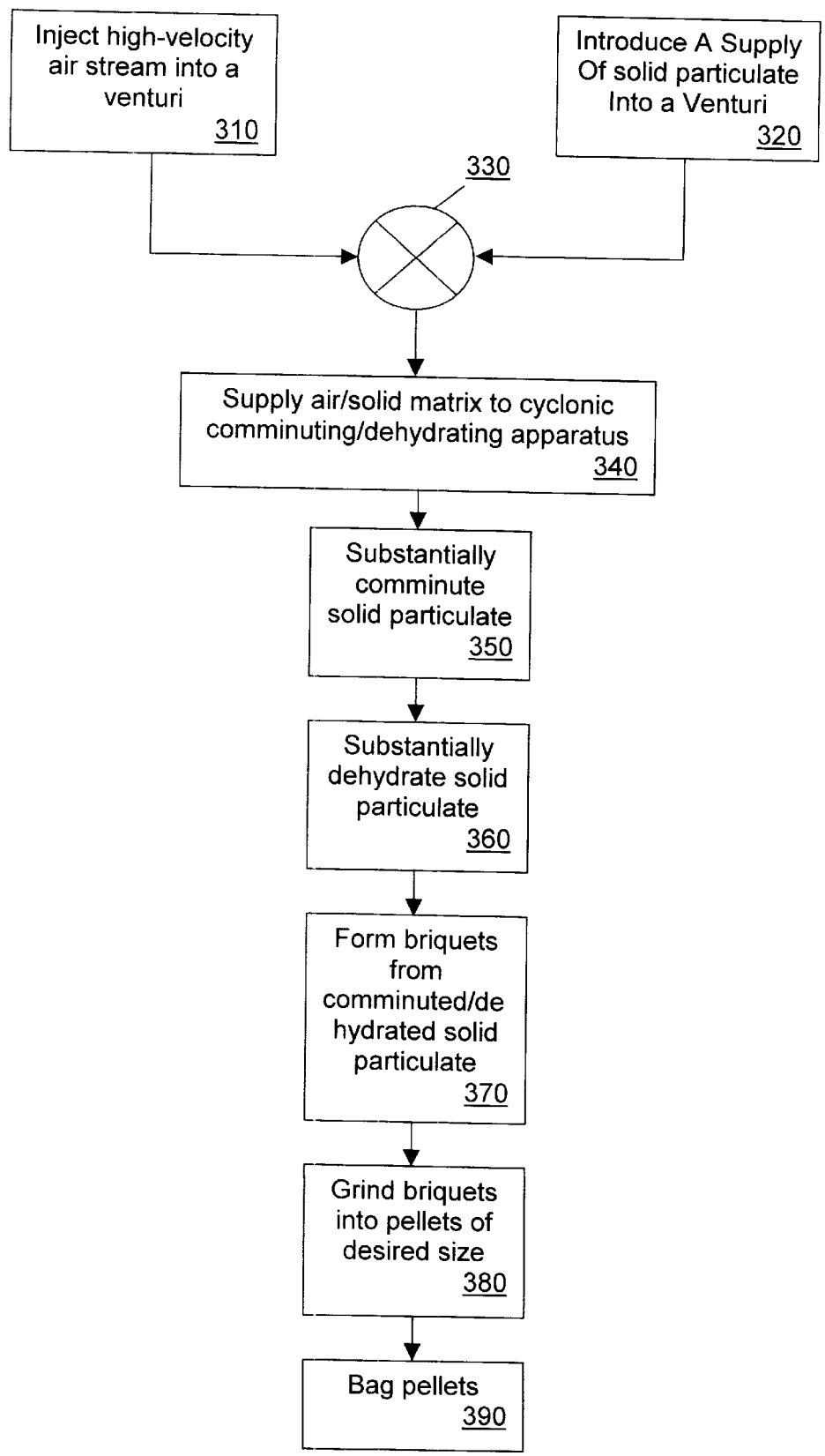

SYSTEMS AND METHODS FOR PRODUCING ORGANIC FERTILIZER, AND ORGANIC FERTILIZER MANUFACTURED USING SAID SYSTEMS OF METHODS

CROSS REFERENCE TO RELATED APPLICATIONS

This application claim the benefit of U.S. Provisional Application Ser. No. 60/085,196, filed May 12, 1998, entitled "Organic Waste Recycling Process," and from U.S. Provisional Application Ser. No. 60/087,763, filed Jun. 2, 1998, entitled "Process for Recycling Livestock Manure and Poultry Litter."

TECHNICAL FIELD OF THE INVENTION

The present invention is directed, in general, to fertilizers and, more specifically, to systems and methods for producing organic fertilizer from raw manure, and organic fertilizer manufactured using said systems or methods, wherein said organic fertilizer has a moisture content substantially less than an initial moisture content and a live bacteria content substantially equal to an initial live bacteria content of the raw manure.

BACKGROUND OF THE INVENTION

Confined animal feeding operations, where raw manure is collected and stockpiled, are increasingly becoming an environmental concern throughout the world. It is estimated that such feeding operations produce up to 1.4 billion tons of manure per year, and stockpiles of manure and other waste products are becoming a major focus of various state regulatory agencies and the U.S. Environmental Protection Agency. Consequently, a problem that must be addressed is how to adequately dispose of or recycle raw manure.

Raw manure, when properly processed, can be used to satisfy the ever increasing demand for natural, organic fertilizers. Processed manure can also be used as a soil amendment for such areas as parks, golf courses and lawns. In various known systems, raw manure is mechanically milled or ground with hammermills or grinders prior to a process in which the manure is dried in a rotary drum dryer at between about 350 and 500 degrees Fahrenheit. A roll compactor is used to form briquets from the pulverized and dried raw manure, which are then reground to a desired granule size. Although there is a demand for recycled raw manure, such prior art systems and methods have not proved satisfactory for both environmental and economic reasons.

First, conventional systems used to recycle raw manure into organic fertilizer have involved complex methods of pulverizing, drying, and compacting. Second, the expense associated with such complex methods has made the successful commercialization of organic fertilizers virtually cost prohibitive. Also, the heat generally required for drying the raw manure is not only very expensive, but it also destroys bacteria in the raw manure, which can result in an organic fertilizer product having a live bacteria content less than a desired level. The process of forming pellets from the pulverized and dried raw manure also produces a great amount of airborne particulates that present a potential health and safety hazard, thereby necessitating the use of particulate containment or purifying systems.

Accordingly, there is need in the art for improved systems and methods to produce organic fertilizer from raw manure; such improved systems and methods are preferably more efficient, more cost-effective, and more environmentally-friendly than prior art systems and methods, and should not substantially destroy the desired live bacteria content of the raw manure during the conversion process to organic fertilizer.

SUMMARY OF THE INVENTION

To address the above-discussed deficiencies of the prior art, the present invention relates to organic fertilizer produced from raw manure, and systems and methods for the production thereof. Unlike conventional systems and methods used in the manufacture of organic fertilizers, systems and methods employing the principles of the present invention do not necessarily rely on a heating process to deplete the moisture content of raw manure. The elimination of a heating process results in an organic fertilizer product characterized by a live bacteria content substantially equal to the initial live bacteria content of the raw manure. Moreover, the systems and methods disclosed herein are more efficient and ecologically-friendly than conventional systems and methods.

In general embodiments, a high-velocity air stream is injected into at least one substantially-closed chamber, where it interacts with a supply of raw manure; the raw manure can be bovine or other animal waste products. The high-velocity air stream pulverizes and dries the raw manure, whereby an end product having a moisture content substantially less than the initial moisture content and a live bacteria content substantially equal to the initial live bacteria content of the raw manure is produced.

In a specific embodiment described in detail hereinafter, a cyclonic comminution apparatus is used to pulverize and dry the raw manure; alternatively, a first cyclonic comminution apparatus can be used to substantially pulverize the raw manure and a second cyclonic comminution apparatus can be used to substantially dehydrate the raw manure. Preferably, a heat source is not used to facilitate the drying of the raw manure.

A cyclonic comminution apparatus can include an inverted frustoconical chamber, operative to controllably harness the relationships between air-flow velocity and pressure-gradient forces which are naturally present in the cyclonic environment of a tornado or cyclone. An air stream can be accelerated through a venturi to produce an air stream having a desired high-velocity.

A system for producing organic fertilizer according to the principles disclosed herein can further include a roll compactor to form briquets from the pulverized and dehydrated raw manure. The briquets can then be passed through a grinder to reduce the briquets to organic fertilizer pellets of a desired size, and a screening apparatus can be provided to separate ones of the organic fertilizer pellets having a size less than such desired size. Finally, a bagging apparatus can be provided to package the organic fertilizer pellets into convenient sizes for transportation and sale; alternatively, the organic fertilizer pellets can be sold in bulk and loaded directly into a transport vehicle, such as a truck or train.

The foregoing has outlined, rather broadly, the principles of the present invention so that those skilled in the art may better understand the detailed description of the exemplary embodiments that follow. Those skilled in the art should appreciate that the disclosed conception and exemplary embodiments can be used as a basis for designing or modifying other structures and methods for carrying out the same purposes of the present invention, and that such equivalent constructions do not depart from the spirit and scope of the invention in its broadest form, except as specifically limited by the claims recited hereinafter.

BRIEF DESCRIPTION OF THE DRAWINGS

For a more complete understanding of the present invention, reference is now made to the following detailed description taken in conjunction with the accompanying drawings, in which:

FIG. 3 illustrates a flowchart of an exemplary method of producing organic fertilizer according to the principles of the present invention.

DETAILED DESCRIPTION

Figure 1:
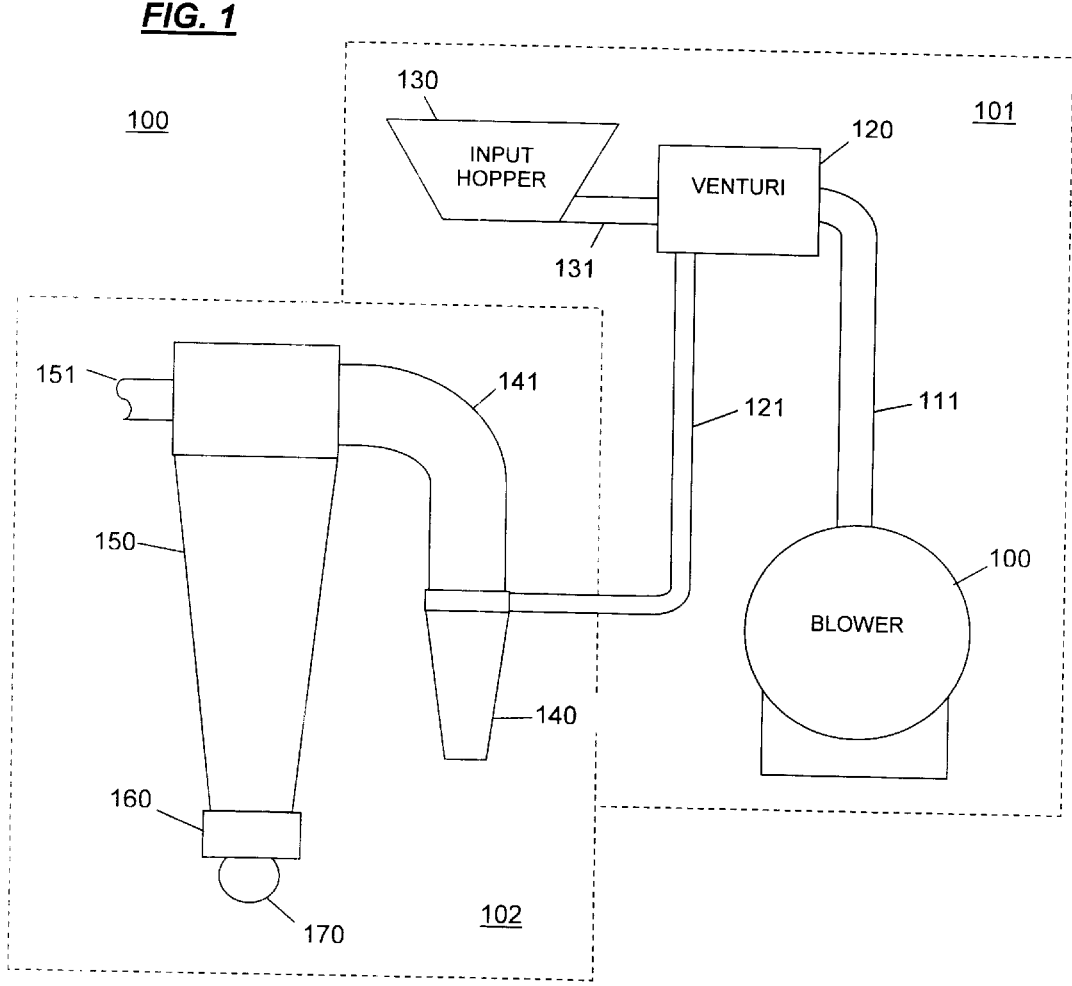
FIG. 1 illustrates a diagrammatic view of an exemplary system for producing organic fertilizer according to the principles of the present invention.

For the purposes of promoting an understanding of the principles in accordance with the invention, reference will now be made to the exemplary embodiments illustrated in the drawings, and specific language will be used to describe the same. It will nevertheless be understood that no limitation of the scope of the invention is thereby intended; any alterations or modifications of the illustrated system, and any additional applications of the principles of the invention as illustrated herein, which would normally occur to one skilled in the relevant art and possessed of this disclosure, are to be considered within the scope of the invention as claimed.

Reference is first made to FIG. 1, which illustrates a diagrammatic view of an exemplary system 100 for producing organic fertilizer according to the principles of the present invention. The exemplary system 100 includes an exemplary injection subsystem 101 and an exemplary cyclonic comminution subsystem 102. The physical structure and operation of the injection subsystem 101 is substantially similar to the structure and operation of the "Boundary Air/Laminar Flow Conveying System with Air Reduction Cone" disclosed by Segota in U.S. Pat. No. 5,718,539 ('539); the descriptive portion of that patent is incorporated herein by reference. The high-velocity output of the injection subsystem 101 is an air/solid matrix that is delivered to the cyclonic comminution apparatus 102 by transport conduit 121.

As described more fully in the '539 patent, the injection subsystem 101 preferably includes a blower 100, venturi 120, input hopper 130 and auger feed mechanism 131. The input hopper 130, which is preferably funnel shaped, is provided to receive a supply of particulate matter, such as raw manure having an initial moisture content and an initial live bacteria content. The auger feed mechanism 131 includes a cantilevered auger (not shown) rotatably disposed within an elongate barrel. The auger feed mechanism 131 is driven in any suitable manner known to those skilled in the art, such as by a motor (not shown) which rotates the auger, causing the auger to convey the particulate matter from input hopper 130 into the venturi 120.

The venturi 120 includes a plenum chamber having a frustoconical air reduction cone (not shown) contained therein. In operation, pressurized air is injected into the plenum chamber by a pressurized air supply, such as blower 110 via air supply line 111. Within the venturi 120, the air flows along an air movement path and becomes formed into a continuous annular stream of pressurized air surrounding the elongate barrel of auger feed mechanism 131. The stream of air operates to carry the particulate matter through the transport conduit 121 to the cyclonic comminution subsystem 102. One example of a blower suitable for the purposes of the present invention is the Roots Blower, Model 14 AZRA5, manufactured by the Roots Dresser Company of Connersville, Ind. The principles of the present invention, however, are not limited to a specific blower or input injection subsystem; any blower or injection subsystem operative to deliver an air/solid matrix at high velocity to the cyclonic comminution subsystem 102 can be used.

The exemplary cyclonic comminution subsystem 102 includes a first cyclonic comminution apparatus 140 coupled to a second cyclonic comminution apparatus 150. With the exceptions described hereinafter, the physical structure and operation of each cyclonic comminution apparatus 140,150 are similar to the structure and operation of the "Gradient-Force Comminuter/Dehydrator Apparatus and Method" disclosed by Rowley in U.S. Pat. No. 5,236,132 ('132); the descriptive portion of that patent is incorporated herein by reference, particularly with respect to the general mechanism and operation of a cyclonic comminuting/dehydrating machine. The principles of the present invention, however, are not limited to a particular form of cyclonic comminuting/dehydrating machine. Reference is also made to the "Method and Apparatus for Recovering Fractional Components of Soil" disclosed by Robinson, et al, in U.S. Pat. No. 5,727,740 ('740), also incorporated herein by reference. Whereas the '740 patent discloses the advantages of employing a cyclonic comminuting apparatus in a system to recover fractional components, such as precious carbon jewels, from earthen material, the present invention recognizes the advantages of employing one or more cyclonic apparatus to the comminution and dehydration of raw manure in the production of organic fertilizer.

In the exemplary cyclonic comminution subsystem 102, the high-velocity air/solid matrix is received by a first cyclonic comminution apparatus 140, which includes a cylindrical upper housing portion and an inverted frustoconical lower housing portion. The high-velocity air/solid matrix is directed into a tornado-like swirling motion within the cylindrical upper housing portion. In the apparatus described in the '132 and '740 patents, the cylindrical upper housing portion is lined with hardened steel rasp bars that, coupled with the differential forces associated with the tornado-like swirling motion within the inverted frustoconical lower housing, serve to comminute material fed therein through implosion, impaction and centrifugal force. In contrast to those apparatus, the cyclonic comminution apparatus 140 and 150 preferably do not include any hardened steel rasp bars. Instead, as the air/solid matrix circulates within the cylindrical upper housing portion, it creates shearing forces that tangentially-intersect solid particulate subsequently injected into the cylindrical upper housing portion from transport conduit 121.

In the exemplary embodiment, the first cyclonic comminution apparatus 140 is physically lower than the input to the second cyclonic comminution apparatus 150. As solid particulate circulates within the first cyclonic comminution apparatus 140, the particulate is progressively and substantially comminuted into lighter particles that are drawn to a central low pressure region and expelled upwardly through transport conduit 141 to an input of second cyclonic comminution apparatus 150.

In the exemplary embodiment, the second cyclonic comminution apparatus 150 is preferably provided to further comminute and dehydrate the particulate in the air/solid matrix. The second cyclonic comminution apparatus 150 is substantially larger than the first cyclonic comminution apparatus 140; the relative sizes of the first and second cyclonic comminution apparatus 140 and 150 are a function of the moisture content and plasticity of the raw manure to be processed. The relatively larger size of the second cyclonic comminution apparatus 150 results in a decrease in the air velocity therein, whereby substantially comminuted particulate settles to a bottom portion of the inverted frustoconical lower housing portion as it is further dehydrated. An airlock 160 is preferably coupled to the lower end of the inverted frustoconical lower housing portion to receive the dry particulate, and a waste air conduit 151 is coupled to the cylindrical upper housing portion to expel air from within the second cyclonic comminution apparatus 150. As more fully described with reference to FIG. 2, a conveyer 170 is coupled beneath the airlock 160 for receiving and transporting the dry particulate to further processing apparatus.

Figure 2:
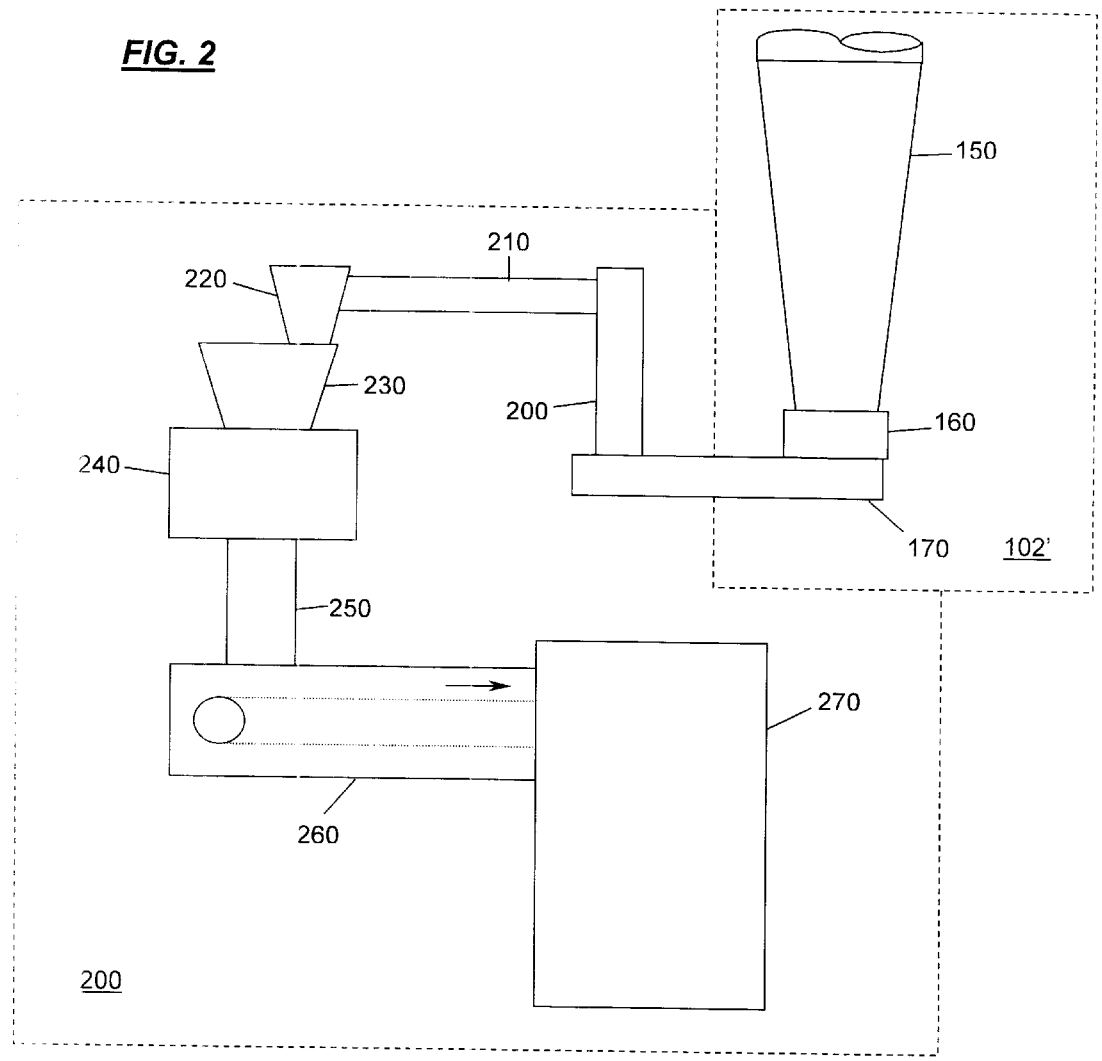
FIG. 2 illustrates a diagrammatic view of an exemplary system for producing granulated organic fertilizer from an intermediate product produced using the system illustrated in FIG. 1.

Turning now to FIG. 2, illustrated is a diagrammatic view of an exemplary system 200 for producing granulated organic fertilizer from an intermediate product produced by the system 100 illustrated in FIG. 1; a portion 102' of the cyclonic comminution apparatus 102 shown and described in FIG. 1 is also included to illustrate the manner in which the systems interface. As noted above, the substantially comminuted and dehydrated particulate settles into an airlock 160 coupled to a bottom portion of the cyclonic comminution apparatus 150. A screw-type conveyer 170 is coupled beneath the airlock 160 for receiving and transporting the dry particulate to further processing apparatus.

In the exemplary system 200, the screw-type conveyer 170 transports dry particulate to a bucket elevator 200 that lifts the dry particulate to a conveyer 210. The conveyer 210 transports the dry particulate to an input hopper 220 associated with a roll compactor 240 having an input feeder 230. Those skilled in the art are familiar with the structure and operation of roll compactors suitably operative to form briquets from the intermediate dry particulate. One example of a roll compactor suitable for the purposes of the present invention is the Bepex Briquetter, Model 150 MS, manufactured by the Fitzpatrick Company of Elmhurst, Ill. After forming the dry particulate into briquets, the briquets are transferred to a grinder 250 operative to reduce the briquets to organic fertilizer pellets of a desired size. One example of a grinder suitable for the purposes of the present invention is the Fitzpatrick Fitzmill, Model OKA S012, also manufactured by the Fitzpatrick Company of Elmhurst, Ill. Upon exiting the grinder 250, the fertilizer pellets are placed on a conveyer 260 and transferred to an automatic bagging machine 270. In a preferred embodiment, the conveyer 260 comprises a vibrating screen that is operative to separate ones of the organic fertilizer pellets having a size less than a desired size, whereby only fertilizer pellets having a dimension greater than or equal to the desired size are transported by the conveyer 260 to the automatic bagging machine 270. One example of an automatic bagging machine suitable for the purposes of the present invention is the St. Regis Auto Bagger, Model 3000, manufactured by the Fitzpatrick Company of Elmhurst, Ill.

Finally, FIG. 3 illustrates a flowchart of an exemplary method 300 of producing organic fertilizer according to the principles of the present invention. The exemplary method 300 includes Steps 310 and 320, wherein a high-velocity air stream and a supply of solid particulate, such as raw manure, are simultaneously introduced into a venturi. In a Step 330, the high-velocity air stream and supply of air particulate are combined to produce an air/solid matrix traveling at high speed. In applications of the systems and methods disclosed herein for converting raw manure to organic fertilizer, an air-stream in the range of 350 to 400 miles-per-hour has resulted in acceptable results. Those skilled in the art will recognize, however, that the air speed required in a specific application can be a function of the characteristics of the raw manure to be processed, such as the density, moisture content and plasticity.

In a Step 340, the air/solid matrix is supplied to a cyclonic comminuting/dehydrating apparatus. In Steps 350 and 360, the solid particulate in the air/solid matrix is substantially comminuted and dehydrated, respectively. Although illustrated as two distinct process steps, those skilled in the art will recognize that, in certain applications, a single cyclonic comminuting/dehydrating apparatus can be used to simultaneously comminute and dehydrate a solid particulate; such embodiments are intended to be within the scope of the claims recited hereinafter.

Next, in a Step 370, briquets are formed from the comminuted/dehydrated dry articulate. The formation of briquets is only necessary if it is desired to produce a product in pellet form; in such applications, the exemplary method 300 further includes a Step 380 in which the briquets are ground into pellets of a desired size. As noted previously, a screening apparatus can also be used to filter pellets having a size less than a desired size. Finally, unless the organic fertilizer is to be transported in bulk, the exemplary method 300 includes a Step 390 in which the organic fertilizer pellets are bagged for transportation.

From the foregoing, those skilled in the art will recognize that the present invention provides significant advantages to the field of producing organic fertilizer from raw manure. The principles disclosed herein satisfy not only the desire for more efficient, more cost-effective, and more environmentally-friendly manufacturing systems and methods than those known in the prior art, but also satisfy the desire to produce organic fertilizer having a live bacteria content substantially equivalent to that of raw manure.

Although the present invention has been described in detail, those skilled in the art will conceive of various changes, substitutions and alterations to the exemplary embodiments described herein without departing from the spirit and scope of the invention in its broadest form. The exemplary embodiments presented herein illustrate the principles of the invention and are not intended to be exhaustive or to limit the invention to the form disclosed; it is intended that the scope of the invention be defined by the claims appended hereto, and their equivalents.

What is claimed is:

1. A method for producing organic fertilizer, said method comprising the steps of:

injecting a high-velocity air stream and a supply of raw manure into a first cyclonic apparatus comprising an inverted frustoconical chamber, said raw manure having an initial moisture content and an initial live bacteria content, wherein as said raw manure circulates within said first cyclonic apparatus it is progressively pulverized and dehydrated into lighter particles that are drawn to a central low pressure region within said first cyclonic apparatus and expelled upwardly through a transport conduit to an input of a second cyclonic apparatus comprising an inverted frustoconical chamber, said first cyclonic apparatus being physically lower than said input to said second cyclonic apparatus; and receiving substantially all of said lighter particles of said raw manure into said second cyclonic apparatus, said second cyclonic apparatus being substantially larger than said first cyclonic apparatus, whereby the relatively larger size of said second cyclonic apparatus results in a decrease in the air velocity therein, resulting in the settling of substantially all of said lighter particles of said raw manure to a bottom portion of said second cyclonic apparatus as they are further dehydrated, whereby an intermediate organic fertilizer product having a moisture content substantially less than said initial moisture content and a live bacteria content substantially equal to said initial live bacteria content is produced.

2. The method recited in claim 1, wherein said method does not include heating said raw manure to facilitate said drying.

3. The method recited in claim 1, wherein said step of injecting comprises accelerating an air stream through a venturi.

4. The method recited in claim 1, wherein said raw manure comprises bovine waste products.

5. A system for producing organic fertilizer, said system comprising:
   a first cyclonic apparatus comprising:
      an inverted frustoconical chamber;
      a first inlet for receiving a high-velocity matrix of air and raw manure; and
      a first outlet proximate the upper portion of said inverted frustoconical chamber;
   a second cyclonic apparatus comprising:
      an inverted frustoconical chamber, said second cyclonic apparatus being substantially larger than said first cyclonic apparatus; and
      a first inlet coupled to said first outlet of said first cyclonic apparatus, said first inlet of said second cyclonic apparatus being disposed above said first outlet of said first cyclonic apparatus;
   means for generating a high-velocity air stream; and
   means for combining a supply of raw manure into said high-velocity air stream to yield said high-velocity matrix of air and raw manure, said raw manure having an initial moisture content and an initial live bacteria content, wherein:
      said matrix of air and raw manure can be injected into said first cyclonic apparatus and caused to circulate therein, whereby substantially all of said raw manure is progressively pulverized and dehydrated into lighter particles that are drawn to a central low pressure region and drawn upwardly and expelled through said first outlet of said first cyclonic apparatus and into said first inlet of said second cyclonic apparatus; and
      substantially all of said lighter particles of said raw manure are received into said second cyclonic apparatus and caused to circulate therein, wherein the relatively larger size of said second cyclonic apparatus results in a decrease in the air velocity therein sufficient to result in the settling of substantially all of said lighter particles of said raw manure to a bottom portion of said second cyclonic apparatus as they are further dehydrated, whereby an intermediate organic fertilizer product having a moisture content substantially less than said initial moisture content and a live bacteria content substantially equal to said initial live bacteria content is produced.

6. The system recited in claim 5, wherein said matrix of air and raw manure is not heated while passing through said system.

7. The system recited in claim 5, wherein:
   said first cyclonic apparatus comprises a vertical cylindrical portion coupled to the upper portion of said inverted frustoconical chamber of said first cyclonic apparatus; and
   said first inlet of said first cyclonic apparatus is through said vertical cylindrical portion.

8. The system recited in claim 5, wherein:
   said second cyclonic apparatus comprises a vertical cylindrical portion coupled to the upper portion of said inverted frustoconical chamber of said second cyclonic apparatus; and
   said first inlet of sad second cyclonic apparatus is through said said vertical cylindrical portion.

9. The system recited in claim 5, wherein:
   said first outlet of said first cyclonic apparatus is substantially larger than said first inlet thereof; and
   said first inlet of said second cyclonic apparatus is substantially the same size as said first outlet of said first cyclonic apparatus, said system further comprising a transport conduit coupling said first outlet of said first cyclonic apparatus to said first inlet of said second cyclonic apparatus.

10. The system recited in claim 5, wherein said raw manure comprises bovine waste products.

* * * * *